United States Patent
Yamauchi

(10) Patent No.: US 7,146,483 B2
(45) Date of Patent: *Dec. 5, 2006

(54) MEMORY SYSTEM

(75) Inventor: Hiroyuki Yamauchi, Takatsuki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 492 days.

This patent is subject to a terminal disclaimer.

(21) Appl. No.: 10/329,164

(22) Filed: Dec. 24, 2002

(65) Prior Publication Data

US 2003/0177331 A1 Sep. 18, 2003

Related U.S. Application Data

(63) Continuation of application No. 09/167,744, filed on Oct. 7, 1998, now Pat. No. 6,553,475.

(30) Foreign Application Priority Data

Oct. 9, 1997 (JP) .................................. 9-277750

(51) Int. Cl.
*G06F 12/00* (2006.01)
(52) U.S. Cl. ....................... 711/202; 711/209
(58) Field of Classification Search .................. 711/6, 711/128, 202–203, 206–209
See application file for complete search history.

(56) References Cited

U.S. PATENT DOCUMENTS

| 4,714,993 A | 12/1987 | Livingston et al. ......... 711/206 |
| 5,053,951 A | 10/1991 | Nusinov et al. |
| 5,687,382 A | 11/1997 | Kojima et al. .............. 713/320 |
| 5,812,816 A | 9/1998 | Parady ....................... 711/165 |
| 5,835,963 A | 11/1998 | Yoshioka et al. ........... 711/207 |
| 6,397,317 B1 | 5/2002 | Kusutaki .................... 711/202 |

FOREIGN PATENT DOCUMENTS

| JP | 58-168166 | 10/1983 |
| JP | 62-134883 | 6/1987 |
| JP | 62-217343 | 9/1987 |
| JP | 63-36456 | 2/1988 |
| JP | 5-233470 | 10/1993 |
| JP | 5-313995 | 11/1993 |
| JP | 6-266615 | 9/1994 |
| JP | 9-69063 | 3/1997 |

*Primary Examiner*—Nasser Moazzami
(74) *Attorney, Agent, or Firm*—Renner, Otto, Boisselle & Sklar, LLP

(57) ABSTRACT

A memory system includes a memory including a plurality of memory regions operating based on an identical principle; and an address conversion device for converting a logical address into a physical address based on a correspondence between an address space and the plurality of memory regions. The correspondence is defined based on an inherent condition regarding a performance of the memory.

19 Claims, 14 Drawing Sheets

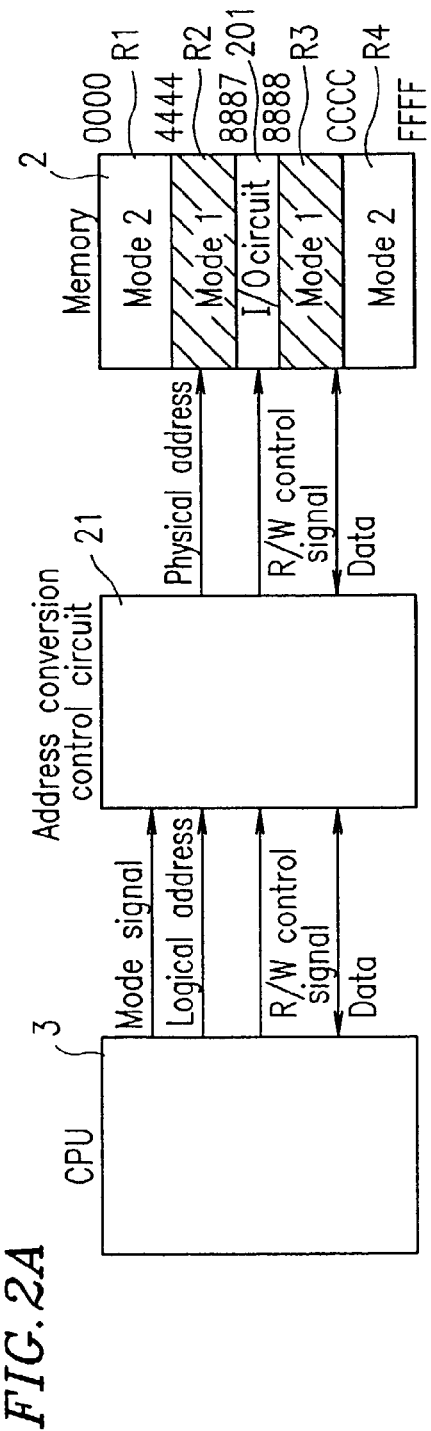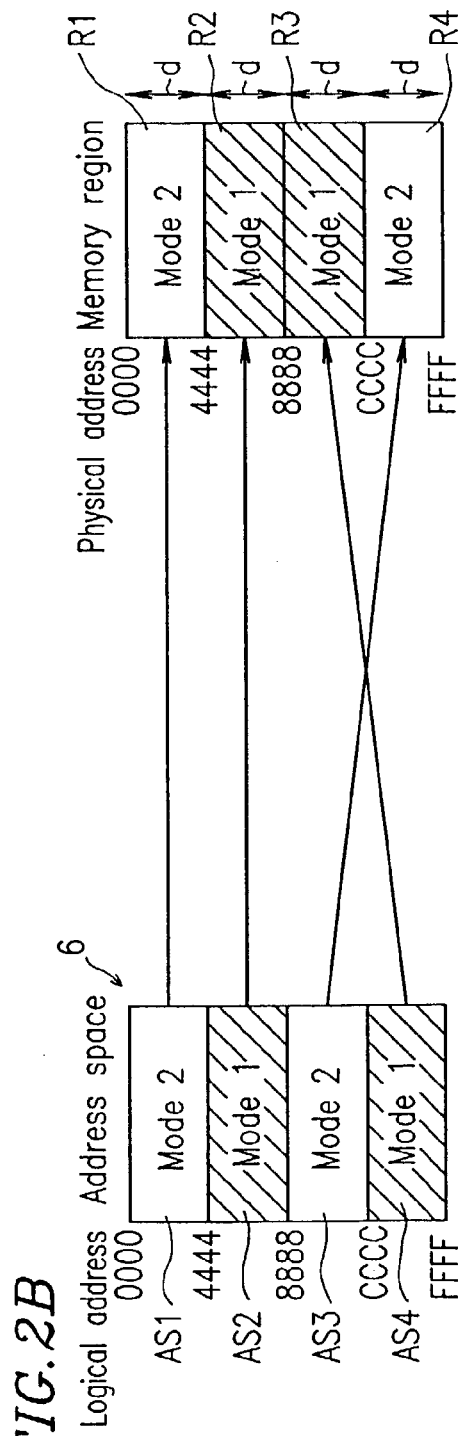
FIG.2A
FIG.2B

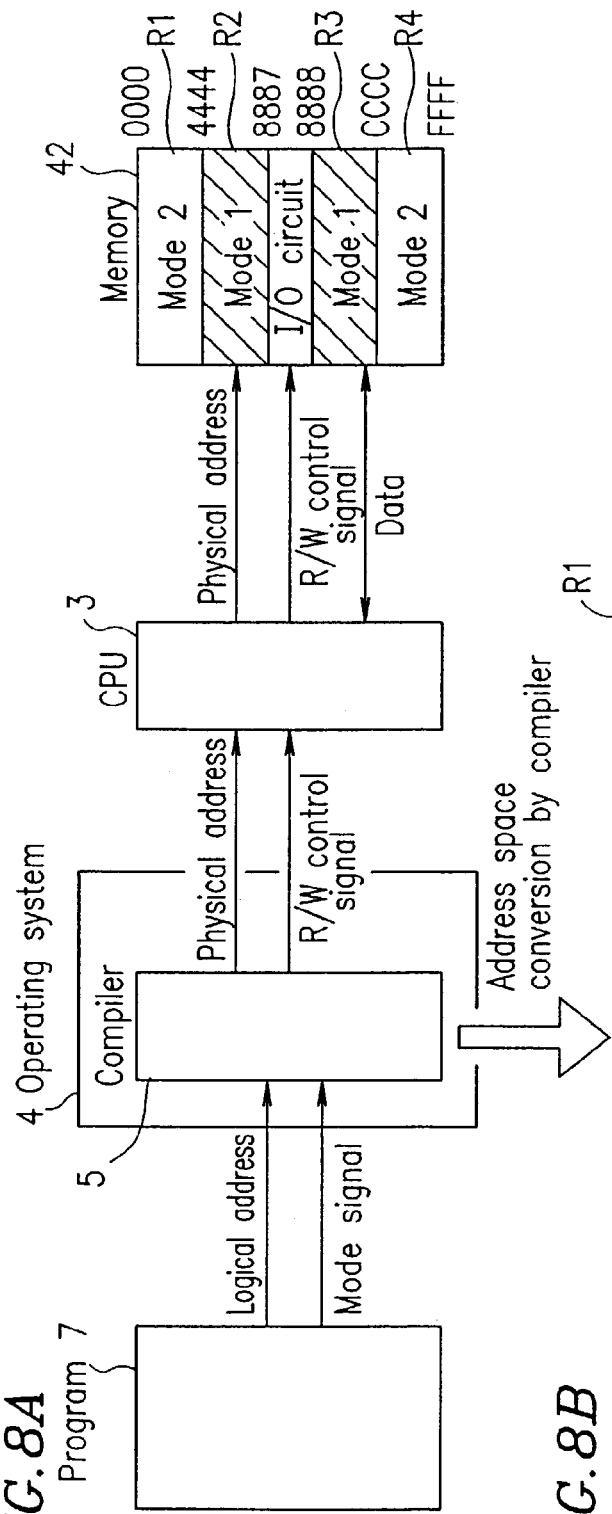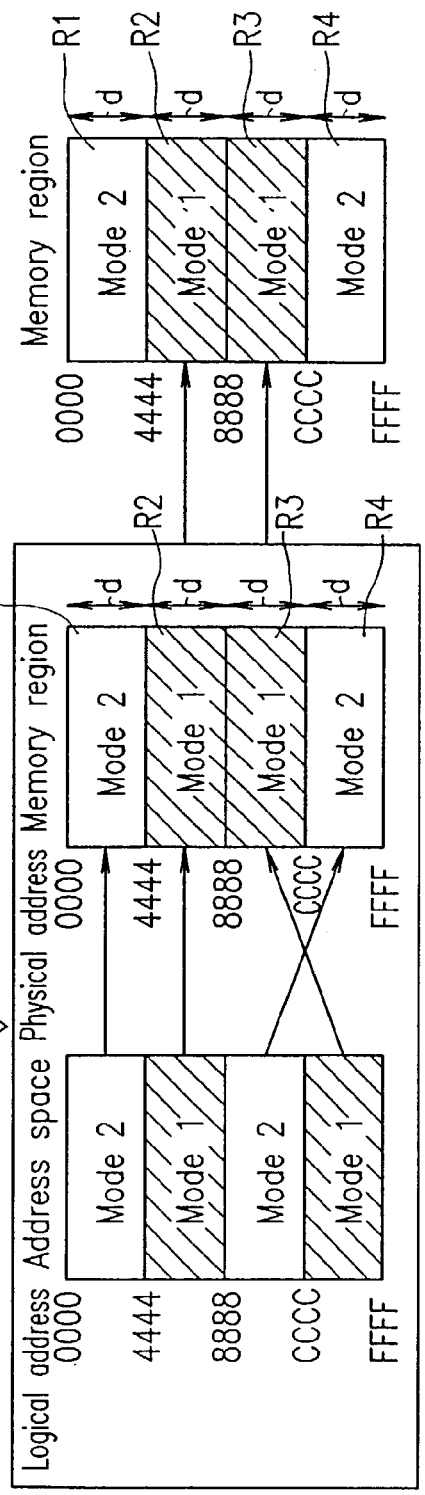
FIG. 8A
FIG. 8B

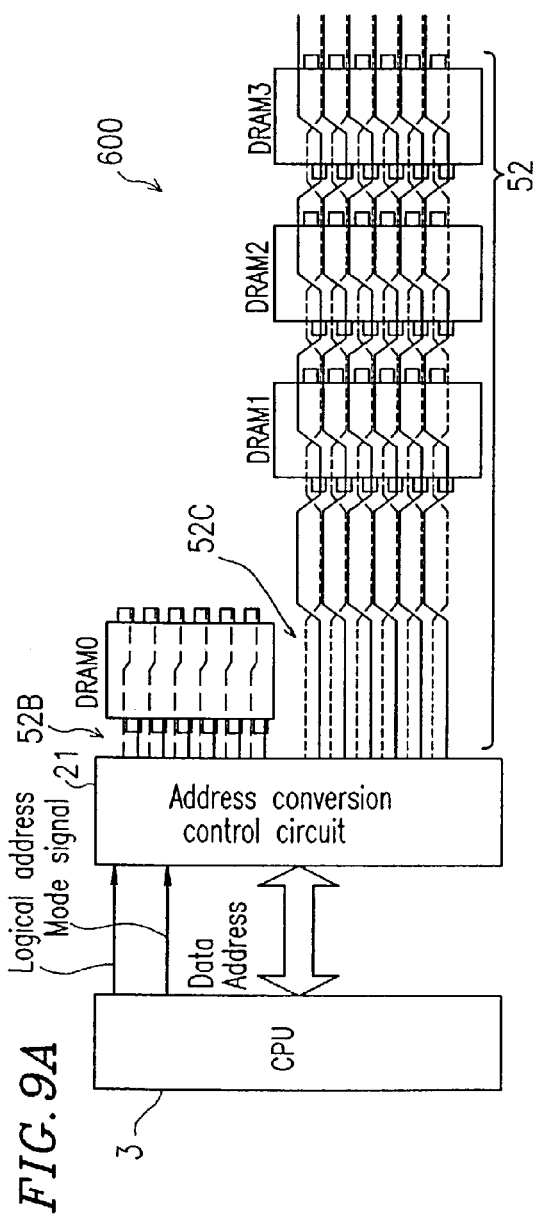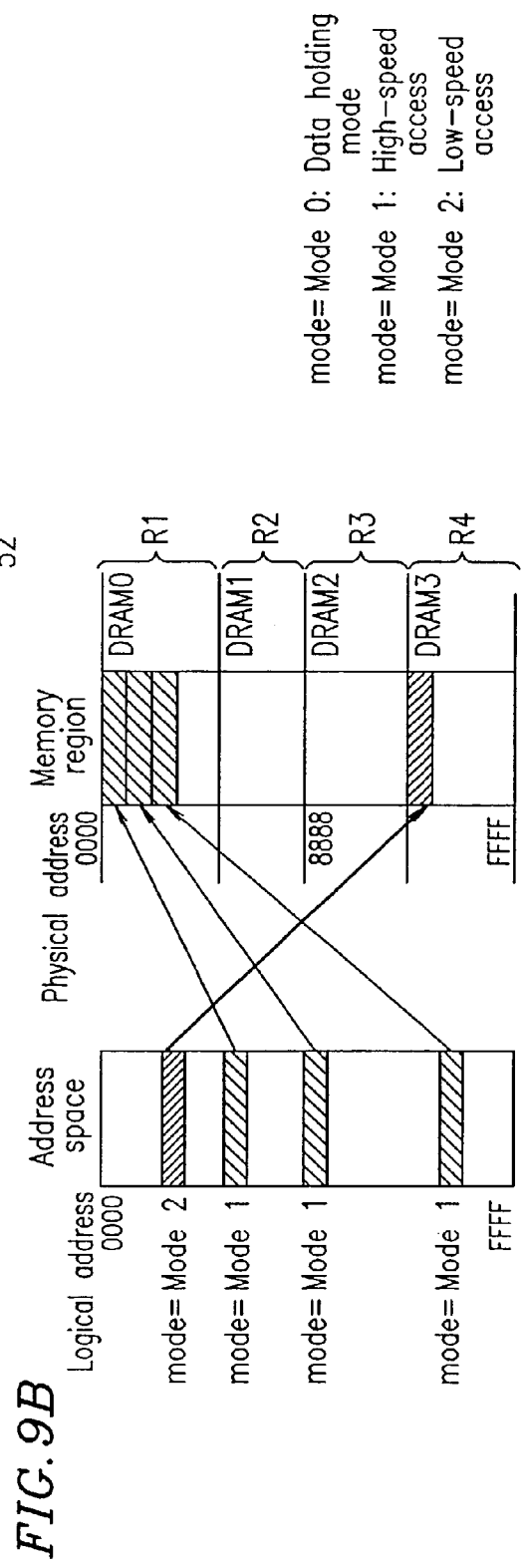
FIG. 9A
FIG. 9B
mode= Mode 0: Data holding mode
mode= Mode 1: High-speed access
mode= Mode 2: Low-speed access 141A: Short data bus selection circuit
141B: Long data bus selection circuit

MEMORY SYSTEM

This is a continuation of application Ser. No. 09/167,744, filed Oct. 7, 1998 now U.S. Pat. No. 6,553,475.

BACKGROUND OF THE INVENTION

1. Field of the Invention

The present invention relates to a memory system including an address conversion circuit, and in particular to a memory system including a memory section having a plurality of memory areas operating based on an identical principle.

2. Description of the Related Art

For accessing a memory including memory cells operating based on an identical principle, a CPU usually sends an address of the memory and a control signal designating operations such as, for example, reading and writing. The memory receives the address sent by the CPU and accesses the memory cell corresponding to the address. All the memory cells in the memory are used with a proposition of operating with an identical level of performance.

In the case of, for example, a 64-megabit dynamic random access memory (hereinafter, referred to as a "DRAM"), all the memory cells in the memory are accessible in an identical access time and refreshed with an identical data holding time.

The performance of the memory cells is significantly varied. The characteristics in the memory are set in accordance with the memory cell having the lowest performance in order that even the memory cell having the lowest performance is guaranteed to operate properly. Thus, even the memory cells having a higher performance cannot be effectively utilized as described specifically below.

For example, 256-megabit DRAM are known to vary in performance such as, for instance, access speed or time and data holding time.

Access time is known to be different among different memory cells in actual use. Since the resistance and length of the lines increase as the lines become thinner, the distance between a memory cell located closest and the input/output circuit and the distance between a memory cell located furthest from the input/output circuit and the input/output circuit are significantly different from each other. Accordingly, even when the memory cells per se are accessible in the same access time, the memory cell closest to the input/output circuit and the memory cell furthest from the input/output circuit turn out to have a difference of several nanoseconds in access time in actual use due to the distance therebetween.

When a memory includes a plurality of memory chips, the distance between a memory chip mounted closest to a memory control circuit and the memory control circuit and the distance between a memory chip mounted furthest from the memory control circuit and the memory control circuit is different from each other by 10 cm or more. It is known that even these two memory chips per se are accessible in the same access time, the access time in actual use to these memory chips is different by 0.5 nanoseconds or more. In this specification, the access time or speed in actual use which is influenced by the distance of the memory cell or chip from the memory control circuit will be referred to as an "effective access time or speed".

In such a case, the effective access time of the entire memory is set to the effective access time of one of all the memory cells which requires the longest time to be accessed.

Data holding time is known to be different among different memory cells by, possibly, about 50 times as demonstrated in an article in ISSCC (1995), page 245, FIG. 2. In such a case, the data holding time of the entire memory is set to the longest data holding time of all the memory cells. A longer data holding time increases the power consumption of the memory cell.

As a shorter access time is demanded in the future, the range of dispersion in the effective access time among the memory cells will be less different from the effective access time required for the memory.

This will be described regarding designing a memory operating at a frequency of 1 GHz. When the memory operates at a frequency of 1 GHz, an access time of 1 nsec. is required. As described above, the memory cell located closest to the memory control circuit and the memory cell located furthest from the memory control circuit are different in the effective access time by 0.5 nsec. or more. In order that the memory cell furthest from the memory control circuit is accessible in an effective access time of 1 nsec., the access time to the memory cell per se needs to be 0.5 nsec. or less (=1 nsec.−0.5 nsec.). Since it is difficult to produce memory chips accessible in an access time of 0.5 nsec. or less, the production cost of the memory is raised.

As memories are demanded to exhibit better characteristics and the performance dispersion among memory cells are unignorable with respect to the demanded level of characteristics, it will become difficult to allow all the memory cells in the memory to have the demanded level of characteristics.

As the total capacity of the memory increases, the difference in the effective access time between the memory cell furthest from the input/output circuit and/or the memory control circuit and the memory cell closest thereto further increases. Thus, it will become more difficult to allow all the memory cells in the memory to have the demanded level of characteristics.

Moreover, as the total capacity of the memory increases, all the memory cells are less likely used for the same purpose. For example, one memory area includes a part required to be accessible at a high access speed and a part required to have a long data holding time although not required to be accessible at a high access speed. Furthermore, the part required to be accessible at a high access speed includes a part required to be accessible at a high random access speed and a part required to be accessible at a high serial access speed. It will become more difficult for each of the memory cells in the memory to fulfill such various requirements corresponding thereto.

SUMMARY OF THE INVENTION

A memory system according to the present invention includes a memory including a plurality of memory regions operating based on an identical principle; and an address conversion device for converting a logical address into a physical address based on a correspondence between an address space and the plurality of memory regions. The correspondence is defined based on an inherent condition regarding a performance of the memory.

In one embodiment of the invention, the correspondence defines that continuous regions included in the address space are allocated to one of the plurality of memory regions in the memory.

In one embodiment of the invention, the memory includes a plurality of memory chips, and the plurality of memory regions are formed of the plurality of memory chips.

In one embodiment of the invention, the memory includes a single memory chip, and the plurality of memory regions are formed of the single memory chip.

In one embodiment of the invention, the address space and the plurality of memory regions have a plurality of correspondences therebetween. The address conversion device includes a selection device for selecting one of the plurality of correspondences between the address space and the plurality of memory regions based on selection information; and a conversion device for converting the logical address into the physical address based on the selected correspondence.

In one embodiment of the invention, the selection device includes an association memory for accumulating the plurality of correspondences; and an output device for outputting one of the plurality of correspondences accumulated in the association memory based on the selection information.

In one embodiment of the invention, the address conversion device includes a compiler for converting a logical address input from an application program into a physical address based on the correspondence.

In one embodiment of the invention, the inherent condition includes a first inherent condition regarding access speed to the memory and a second inherent condition regarding power consumption of the memory.

In one embodiment of the invention, the first inherent condition includes an inherent condition regarding a difference between a distance of a memory cell included in the memory from an input/output circuit and a distance of another memory cell included in the memory from the input/output circuit, an inherent condition regarding the level of an operating frequency of a bus, and an inherent condition regarding the level of an operating voltage of the bus; and the second inherent condition includes an inherent condition regarding the level of a threshold voltage of a transistor included in the memory and an inherent condition regarding a data holding time at standby.

In one embodiment of the invention, the first inherent condition includes an inherent condition regarding a difference between a distance of a memory cell included in the memory from the address conversion device and a distance of another memory cell included in the memory from the address conversion device, an inherent condition regarding the level of an operating frequency of a bus, and an inherent condition regarding the level of an operating voltage of the bus; and the second inherent condition includes an inherent condition regarding the level of a threshold voltage of a transistor included in the memory and an inherent condition regarding a data holding time at standby.

According to the present invention, the address conversion device of a memory system converts a logical address into a physical address based on the correspondence between the address space and the plurality of memory regions in the memory. The correspondence is defined by the inherent conditions regarding the performance of the memory. Therefore, the memory system according to the present invention is allowed to perform to its full capability without being influenced by memory cells or chips having poor capability.

Thus, the invention described herein makes possible the advantages of (1) providing a memory system operable at a high level of characteristics without being influenced by a memory cell having the lowest level of performance; (2) providing a memory system operable with a sufficiently short effective access time without being influenced by a memory cell requiring the longest effective access time; and (3) providing a memory system operable with reduced power consumption without being influenced by a memory cell having the largest power consumption.

These and other advantages of the present invention will become apparent to those skilled in the art upon reading and understanding the following detailed description with reference to the accompanying figures.

BRIEF DESCRIPTION OF THE DRAWINGS

FIG. 2A is a schematic view of a configuration of a memory system in a second example according to the present invention;

FIG. 2B shows a state of address conversion performed by the memory system shown in FIG. 2A;

FIG. 8A shows a structure of a memory system in a fifth example according to the present invention;

FIG. 8B shows a state of address conversion performed by the memory system shown in FIG. 8A;

FIG. 9A is a schematic view of a configuration of a memory system in a sixth example according to the present invention;

FIG. 9B shows a state of address conversion performed by the memory system shown in FIG. 9A;

DESCRIPTION OF THE PREFERRED EMBODIMENTS

Hereinafter, the present invention will be described by way of illustrative examples with reference to the accompanying drawings.

As shown in Table 1, inherent conditions regarding the memory performance include inherent conditions regarding the access speed and inherent conditions regarding power consumption. The inherent conditions regarding the access speed include inherent conditions regarding difference in the distance of the memory cells to an input/output circuit or a memory control circuit, inherent conditions regarding the level of the operating frequency of the bus, and inherent conditions regarding the level of the operating voltage of the bus. The inherent conditions regarding power consumption include inherent conditions regarding the level of the threshold voltage of the transistor and inherent conditions regarding the data holding time at standby.

TABLE 1

| Inherent conditions | Access speed | Distance difference of memory cells to input/output circuit (address conversion circuit) |
|---|---|---|
| | | Level of operating frequency of bus |
| | | Level of operating voltage of bus |
| | Power consumption | Level of threshold voltage of transistor |
| | | Data holding time at standby |

A first through sixth examples according to the present invention relate to the inherent conditions regarding the effective access time to a memory, and a seventh and eighth examples according to the present invention relate to the inherent conditions regarding the power consumption of a memory.

EXAMPLE 1

Figures 1A, 1B:
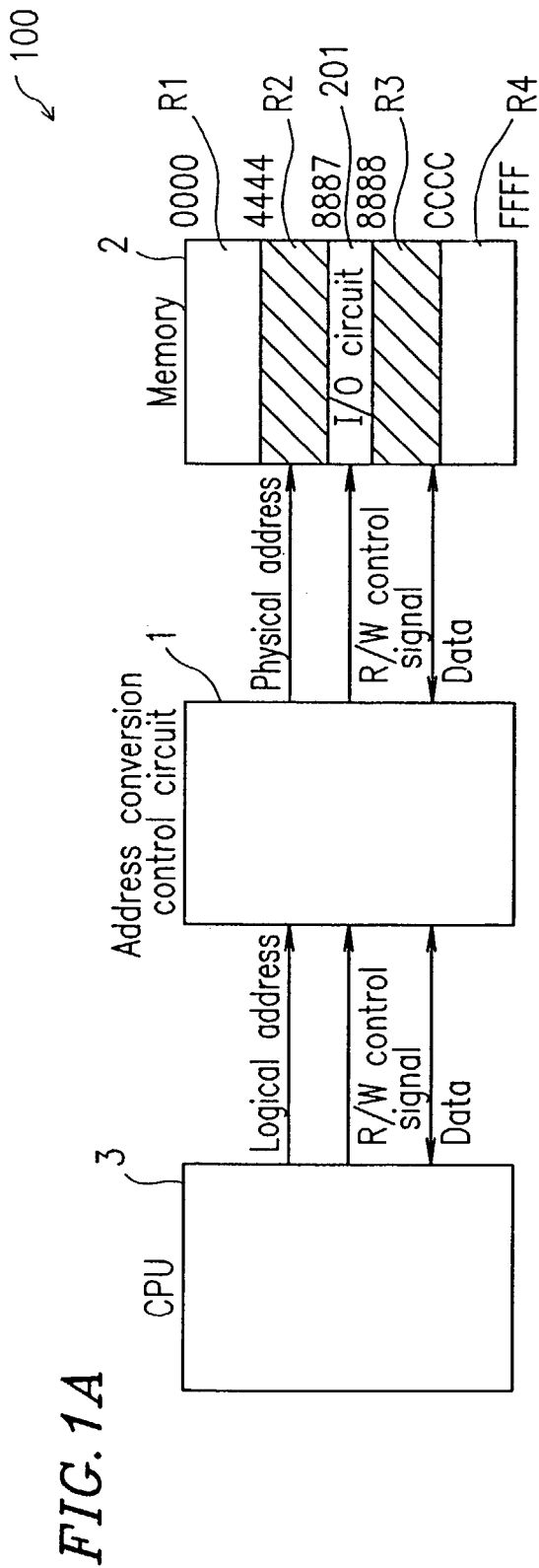
FIG. 1A is a schematic view of a configuration of a memory system in a first example according to the present invention.
FIG. 1B shows a state of address conversion performed by the memory system shown in FIG. 1A.

FIG. 1A is a schematic view of a configuration of a memory system 100 in the first example according to the present invention. FIG. 1B shows a state of address conversion performed by the memory system 100 shown in FIG. 1A.

As shown in FIG. 1A, the memory system 100 includes a CPU 3, an address conversion control circuit 1, and a memory 2. The memory 2 includes an input/output circuit 201 and memory regions R1, R2, R3 and R4. Memory cells in the memory regions R1 and R4 are located further from the input/output circuit 201 than memory cells in the memory regions R2 and R3.

As described above, the distance between the memory cells in the memory regions R1, R4 and the input/output circuit 201 is different from the distance between the memory cells in the memory regions R2, R3 and the input/output circuit 201. Accordingly, even when all the memory cells per se are accessible at the same access speed, the memory cells in the memory regions R1, R4 and the memory cells in the memory regions R2, R3 are accessible at different effective access speeds. The memory cells in the memory regions R1, R4 are accessible at a lower effective access speed than the memory cells in the memory regions R2, R3.

Referring to FIG. 1B, an address space 6 includes continuous address space regions AS1, AS2, AS3 and AS4. The address space regions AS1, AS2, AS3 and AS4 correspond to the memory regions R1, R2, R3 and R4 as indicated by four arrows in FIG. 1B. Such correspondence is defined based on the inherent conditions regarding the access speed, the inherent conditions being determined based on the difference in distance to the input/output circuit 201 among the memory cells in the memory regions R1 through R4. The access space regions AS1 and AS2 which are used for high-speed access are located relatively closer to the input/output circuit 201 and allocated for the memory regions R2 and R3 including memory cells accessible at a high effective access speed. The access space regions AS3 and AS4 which are used for low-speed access are located relatively further from the input/output circuit 201 and allocated for the memory regions R1 and R4 including memory cells accessible at a low effective access speed.

The memory system 100 operates, for example, as follows.

Before the use of the memory system 100, the CPU 3 and the address conversion control circuit 1 determine together which regions of the address space 6 are used for high-speed access and which regions of the address space 6 are used for low-speed access. In the first example, the address space region AS1 (logical address: 0000 to 4444) or AS2 (logical address: 4445 to 8888) is used for high-speed address, and the address space region AS3 (logical address: 8889 to CCCC) or AS4 (logical address: CCCD to FFFF) is used for low-speed address.

When the CPU 3 requests high-speed access, the CPU 3 supplies the address conversion control circuit 1 with the logical address corresponding to the address space region AS1 or AS2, i.e., (0000 to 8888) as well as a control signal designating the reading and writing operations. When the CPU 3 requests low-speed access, the CPU 3 supplies the address conversion control circuit 1 with the logical address corresponding to the address space region AS3 or AS4, i.e., (8888 or FFFF) as well as a control signal designating the reading and writing operations.

The address conversion control circuit 1 converts the logical address supplied by the CPU 3 into a physical address based on the correspondence shown in FIG. 1B, as described specifically below.

Upon receiving the logical address (0000 to 8888) corresponding to the address space region AS1 or AS2 from the CPU 3, the address conversion control circuit 1 determines that the CPU 3 requests high-speed access and converts the logical address into a physical address corresponding to the memory region R2 or R3 including the memory cells accessible at a high effective access speed.

Upon receiving the logical address (8889 to FFFF) corresponding to the address space region AS3 or AS4 from the CPU 3, the address conversion control circuit 1 determines that the CPU 3 requests low-speed access and converts the logical address into a physical address corresponding to the memory region R1 or R4 including the memory cells accessible at a low effective access speed.

Such address conversion is executed based on the following algorithm.

if Add<4444 then Add=Add+d, else
if 4444≦Add<8888 then Add=Add+d, else
if 8888≦Add<CCCC then Add=Add−2d, else
if Add≧CCCC then Add=Add

EXAMPLE 2

FIG. 2A is a schematic view of a configuration of a memory system 200 in the second example according to the present invention. FIG. 2B shows a state of address conversion performed by the memory system 200 shown in FIG. 2A. Identical elements previously discussed with respect to FIGS. 1A and 1B bear identical reference numerals and the descriptions thereof will be omitted.

The memory system 200 operates, for example, as follows.

The CPU 3 supplies an address conversion control circuit 21 with a mode signal representing whether high-speed access or low-speed access is requested and with a logical address, as described specifically below.

When the CPU 3 requests high-speed access, the CPU 3 supplies the address conversion control circuit 21 with a mode signal representing a request for high-speed access (mode=mode 1) and an arbitrary logical address (0000 to FFFF) as well as a control signal designating the reading and writing operations. When the CPU 3 requests low-speed access, the CPU 3 supplies the address conversion control circuit 21 with a mode signal representing a request for low-speed access (mode=mode 2) and an arbitrary logical address (0000 to FFFF) as well as a control signal designating the reading and writing operations.

Upon receiving a mode signal representing a request for high-speed access (mode=mode 1) from the CPU 3, the address conversion control circuit 21 converts the logical address received from the CPU 3 together with the mode signal into a physical address corresponding to the memory region R2 or R3 including the memory cells accessible at a high effective access speed.

Upon receiving a mode signal representing a request for low-speed access (mode=mode 2) from the CPU 3, the address conversion control circuit 21 converts the logical address received from the CPU 3 together with the mode signal into a physical address corresponding to the memory region R1 or R4 including the memory cells accessible at a low effective access speed.

Such address conversion is executed based on the following algorithm.

if (mode=mode 1)∩(Add<4444) then Add=Add+d, else
if (mode=mode 1)∩(4444≦Add<8888) then Add=Add, else
if (mode=mode 1)∩(8888≦Add<CCCC) then Add=Add, else
if (mode=mode 1)∩(Add>4444) then Add=Add, −d, else
if (mode=mode 2)∩(Add<4444) then Add=Add, else
if (mode=mode 2)∩(4444≦Add<8888) then Add=Add, −d, else
if (mode=mode 2)∩(8888≦Add<CCCC) then Add=Add, +d, else
if (mode=mode 2)∩(Add>CCCC) then Add=Add, else
Mode 1: requests high-speed access
Mode 2: requests low-speed access Before the use of the memory system 200, the CPU 3 and the address conversion control circuit 21 do not determine which regions of the address space 6 are used for high-speed access and which regions of the address space 6 are used for low-speed access. Whether the request for access from the CPU 3 is for high-speed access or low-speed access is determined by the address conversion control circuit 21 based on the mode signal output by the CPU 3.

FIG. 2B shows the correspondence between the address space regions AS1 through AS4 and the memory regions R1 through R4 in the case where the CPU 3 requests a logical address in the address space regions AS1 and AS3 for low-speed access and requests a logical address in the address space regions AS2 and AS4 for high-speed access.

Figure 3:
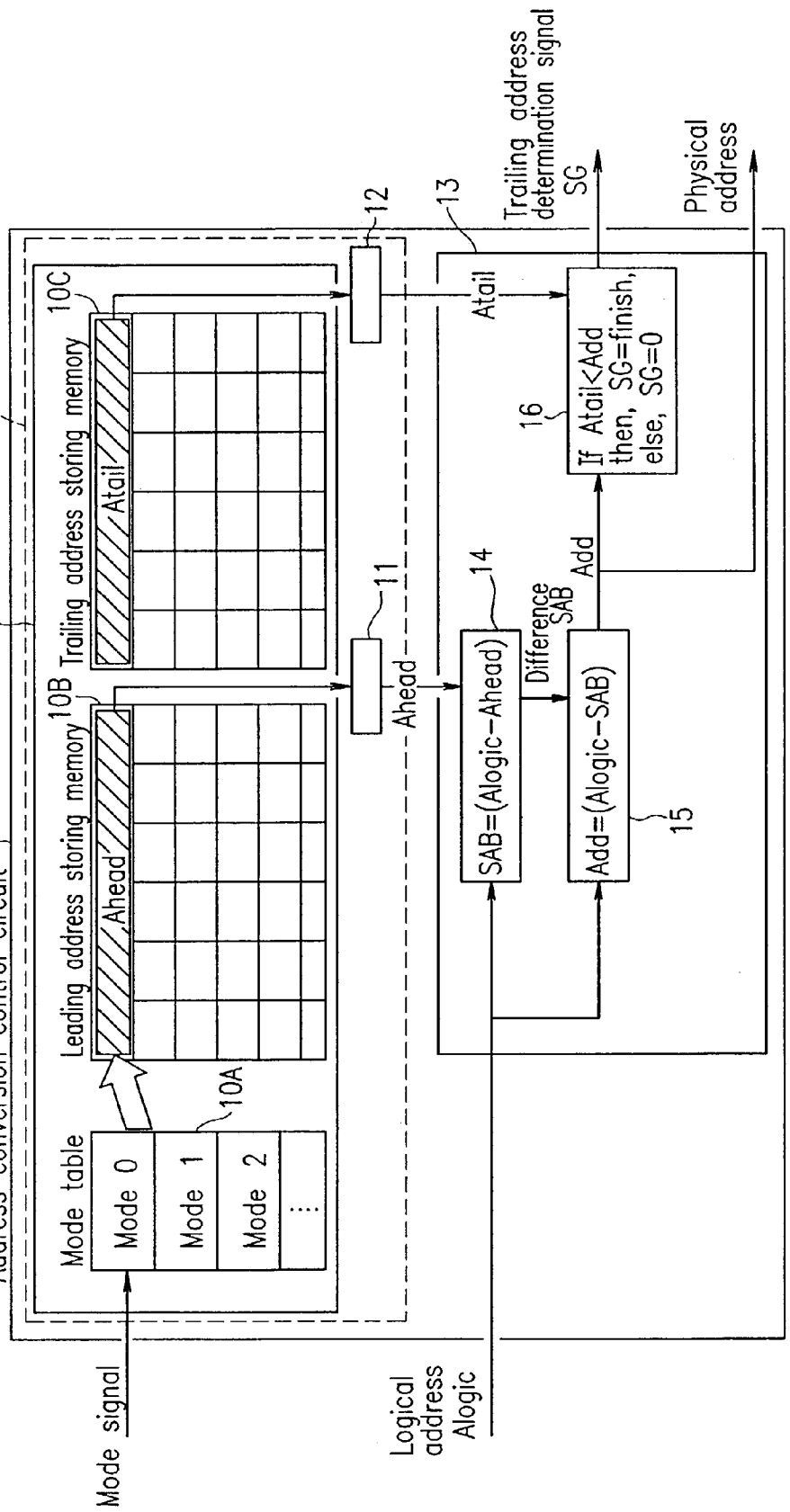
FIG. 3 shows a structure of an address conversion control circuit in the memory system shown in FIG. 2A.
Figure 4:
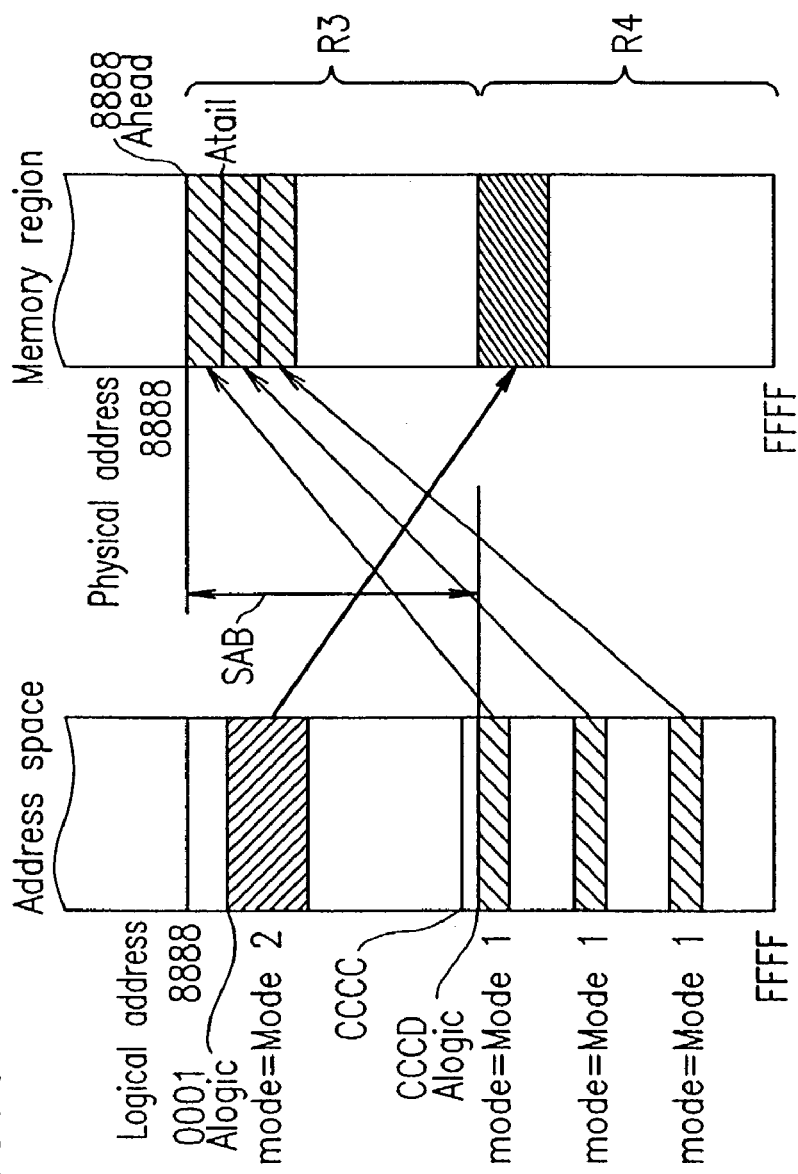
FIG. 4 shows a state of address conversion performed by the address conversion control circuit shown in FIG. 3.

With reference to FIGS. 3 and 4, the address conversion control circuit 21 in the second example will be described in more detail. FIG. 3 shows a structure of the address conversion control circuit 21, and FIG. 4 shows a state of address conversion performed by the address conversion control circuit 21.

As shown in FIG. 3, the address conversion control circuit 21 includes a selection section 17 and a conversion section 13. The selection section 17 includes an association memory 10 and output sections 11 and 12. The association memory 10 includes a mode table 10A for storing the type of mode (e.g., request for high-speed access or request for low-speed access), a leading address storing memory 10B for storing a leading address Ahead, and a trailing address storing memory 10C for storing a trailing address Atail. The conversion section 13 includes a differential device 14, a physical address calculator 15 and a trailing region determination calculator 16.

Upon receiving the mode signal and the logical address Alogic from the CPU 3, the address conversion control circuit 21 having such a structure operates in, for example, the following manner.

The selection section 17 selects a mode corresponding to the input mode signal from the mode table ObA. Then, the selection section 17 selects a leading address Ahead corresponding to the selected mode from the leading address storing memory 10B. Then, the selection section 17 outputs the selected leading address Ahead to the conversion section 13 through the output section 11.

The differential device 14 finds a difference SAB between the logical address Alogic received from the CPU 3 and the leading address Ahead received from the selection section 17 through the output section 11. The physical address calculator 15 subtracts the difference SAB from the logical address Alogic and converts the subtraction result into a physical address Add to be output.

With reference to FIGS. 3 and 4, the address conversion will be described specifically. In the example shown in FIG. 4, the address conversion control circuit 21 receives a mode signal representing a request for high-speed access (mode=mode 1) and a logical address Alogic (CCCD) from the CPU 3.

The difference SAB is obtained by subtracting the corresponding leading address Ahead (8888) from the logical address Alogic (CCCD), i.e., by the following expression.

$$\text{Difference } SAB = Alogic - Ahead$$
$$= CCCD - 8888$$
$$= 4444$$

The conversion section 13 subtracts the difference SAB (4444) from the logical address Alogic (CCCD) and converts the subtraction result to the physical address (8888). Such an operation of the conversion section 13 is repeated until the mode signal input to the address conversion control circuit 21 from the CPU 3 is changed.

The trailing address Atail corresponding to the leading address Ahead is output from the trailing address storing memory 10C, through the output section 12, to the conversion section 13. The trailing address determination calculator 16 generates a trailing address determination signal SG based on the physical address Add received from the physical address calculator 15 and the trailing address Atail received from the trailing address storing memory 10C through the output section 12, and outputs the resultant signal SG. The trailing address determination signal SG indicates whether or not the value of the converted physical address Add exceeds the value of the trailing address Atail, i.e., whether or not there is a shortage of memory regions corresponding to the input logical address Alogic. When there is a shortage of memory regions (i.e., when the trailing address determination signal SG is not 0), a swap operation to the hard disk or another memory (e.g., DRAM) is required. The trailing address determination signal SG is usable as information for controlling the swap operation.

The leading address Ahead and the trailing address Atail can be set when the memory 2 is set up or each time the power is turned ON.

The memory system 200 in the second example, in which the mode signal is processed in addition to the logical address, is effective when the CPU 3 executes a plurality of programs simultaneously. In the memory system 100 shown in FIGS. 1A and 1B, the logical address output when the CPU 3 requests high-speed access is limited to one of the logical addresses corresponding to the address space regions AS1 and AS2, i.e., (0000 to 8888), and the logical address output when the CPU 3 requests low-speed access is limited to one of the logical addresses corresponding to the address space regions AS3 and AS4, i.e., (8889 to FFFF).

In contrast, in the memory system 200 in the second example, the CPU 3 requests any of the address space regions AS1 through AS4 for high-speed access or low-speed access. Upon receiving a mode signal representing a request for high-speed access, the address conversion control circuit 21 converts the logical address received together with the mode signal into a physical address corresponding to the memory region R2 or R3 regardless of the address space region which the logical address belong to. Upon receiving a mode signal representing a request for low-speed access, the address conversion control circuit 21 converts the logical address received together with the mode signal into a physical address corresponding to the memory region R1 or R4 regardless of the address space region which the logical address belong to.

A memory usable in the memory system 200 can include a single memory chip or a plurality of memory chips. A memory including a single memory chip will be described in the third example with reference to FIGS. 5 and 6, and a memory including a plurality of memory chips will be described in the fourth example with reference to FIGS. 7A and 7B. In the third example, the memory is represented by reference numeral 22; and in the fourth example, the memory is represented by reference numeral 32.

EXAMPLE 3

Figure 5:
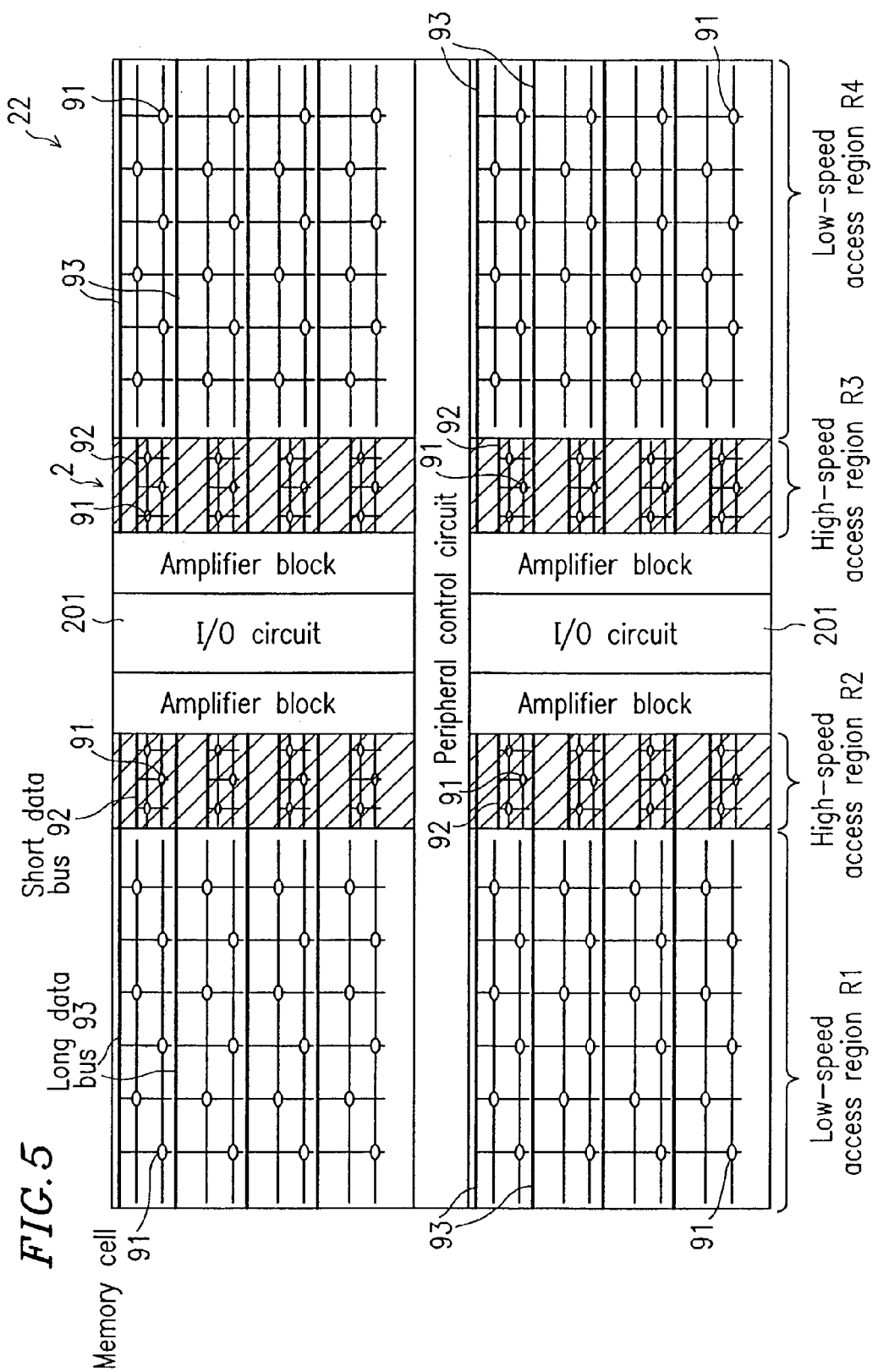
FIG. 5 shows a structure of the memory in a third example according to the present invention.
Figure 6:
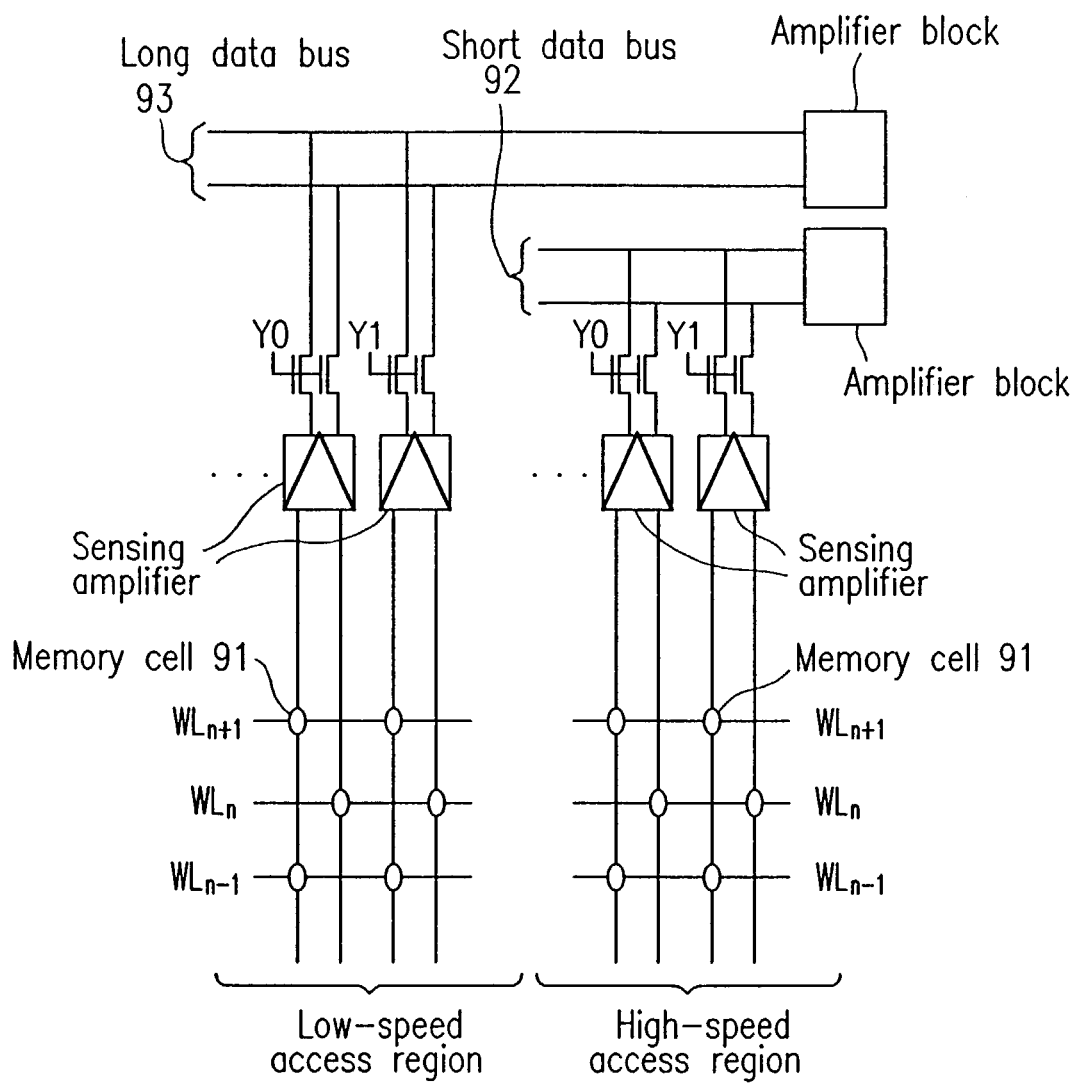
FIG. 6 shows a configuration of a peripheral circuit of memory cells in the memory shown in FIG. 5.

FIG. 5 shows a structure of the memory 22. FIG. 6 shows a configuration of a peripheral circuit of memory cells 91 in the memory 22. In FIG. 5, the memory 22 includes a single memory chip.

As shown in FIG. 5, the memory 22 includes short data buses 92 and long data buses 93. As described above, even when the memory cells 91 are accessible at the same access speed, the memory cells 91 in the memory regions R2 and R3 located closer to the input/output circuit 201 are accessible at a different effective access speed from the memory cells 91 in the memory regions R1 and R4 located further from the input/output circuit 201. The effective access speed to the memory cells 91 in the memory regions R1 and R4 is lower than the effective access speed to the memory cells 91 in the memory regions R2 and R3.

The short data buses 92 are connected to the memory cells 91 in the memory regions R2 and R3 accessible at a high effective access speed, and the long data buses 93 are connected to the memory cells 91 in the memory regions R1 and R4 accessible at a low effective access speed. The memory cells 91 are divided into a high-effective access speed group connected to the short data buses 92 and a low-effective access speed group connected to the long data buses 93.

Referring to FIG. 6, the number of transistor switches Y0 and Y1 connected to the short data buses 92 is smaller than the number of transistor switches Y0 and Y1 connected to the long data buses 93. Accordingly, the short data buses 92 are advantageous in that connecting capacitance of the transistor switches Y0 and Y1 connected to the short data buses 92 is suppressed to be kept small, as well as being short. Thus, the memory cells 91 connected to the short data buses 92 are allowed to be accessed at a higher speed. Thus, provision of the short data buses 92 and the long data buses 93 allows the memory cells 91 to be grouped into memory cells which are required to be accessed at a high effective access speed through the short data buses 92 and memory cells 91 for which low-speed access is satisfactory.

Due to such a structure, the number of memory cells 91 connected to the short data buses 92 is decreased, but the number of the memory cells 91 connected to the long data buses 93 is increased. The increased number of memory cells 91 connected to the long data buses 93 increases the memory capacity. The short data buses 92 have advantages of reducing the required connecting capacitance in addition to being short, and thus form an address space which is allowed to be accessed at a high speed in the memory 22. As a result, a larger memory capacity and a higher effective access speed are both realized, whereas the conventional technology requires both the capacity and the access speed to compromise.

EXAMPLE 4

Figure 7A:
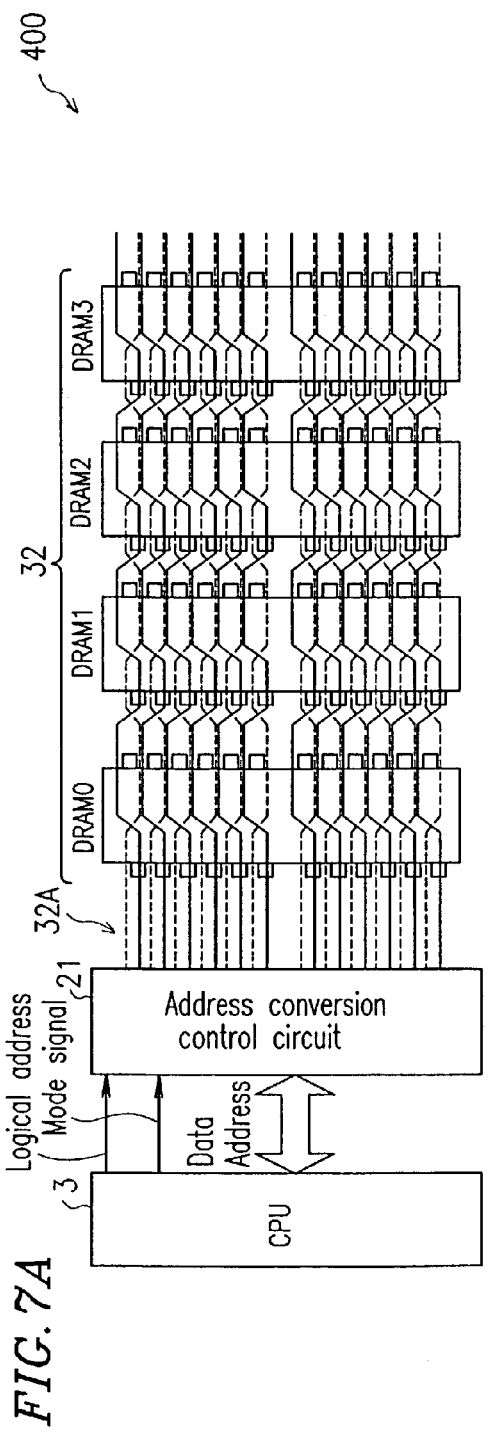
FIG. 7A shows a structure of a memory system in a fourth example according to the present invention.
Figure 7B:
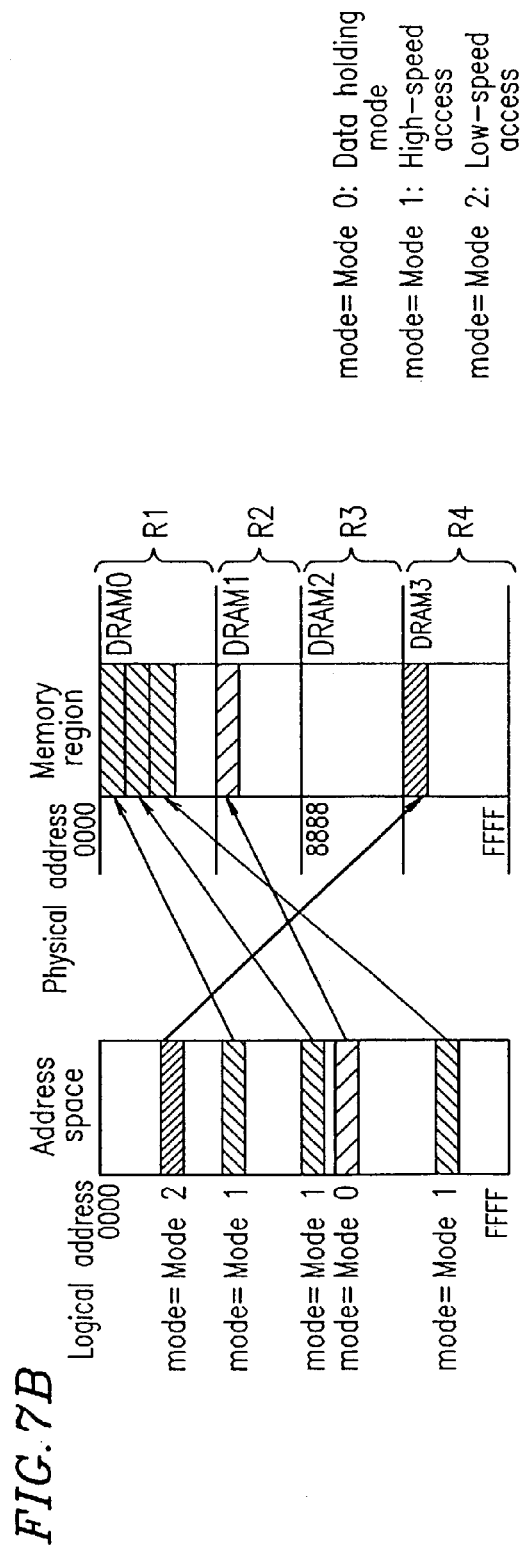
FIG. 7B shows a state of address conversion performed by the memory system shown in FIG. 7A.

With reference to FIGS. 7A and 7B, the memory 32 having a plurality of memory chips will be described. For convenience, the memory system including the memory 32 is indicated by reference numeral 400.

FIG. 7A shows a structure of the memory system 400 including the memory 32. FIG. 7B shows a state of address conversion performed by the address conversion control circuit 21 included in the memory system 400.

As shown in FIG. 7A, the memory 32 includes memory chips DRAM0, DRAM1, DRAM2 and DRAM3. Each of the memory chips DRAM0 through DRAM3 are respectively connected to the address conversion control circuit 21 through buses 32A. The memory chip DRAM0 is mounted closest to the address conversion control circuit 21, and the memory chip DRAM3 is mounted furthest from the address conversion control circuit 21.

The memory 32 includes a plurality of memory chips DRAM0 through DRAM3. Even when the memory chips DRAM0 through DRAM3 per se are accessible at the same access speed, the effective access speed to the memory chip DRAM0 and the effective access speed to memory chip DRAM3 are different. The effective access speed to the memory chip DRAM0 closest to the address conversion control circuit 21 is highest, and the effective access speed to memory chip DRAM3 furthest from the address conversion control circuit 21 is lowest.

A memory region corresponding to the memory chip DRAM0 is used for high-speed access. A memory region corresponding to the memory chip DRAM3 is used for low-speed access. Memory regions corresponding to the memory chips DRAM1 and DRAM2 are used for data holding.

The memory system 400 operates in, for example, the following manner.

Upon receiving a mode signal representing a request for high-speed access (mode=mode 1), the address conversion control circuit 21 converts a logical address received from the CPU 3 together with the mode signal into a physical address corresponding to the memory region R1 corresponding to the memory chip DRAM0 accessible at a highest effective access speed. Upon receiving a mode signal representing a request for low-speed access (mode=mode 2), the address conversion control circuit 21 converts a logical address received from the CPU 3 together with the mode signal into a physical address corresponding to the memory region R4 corresponding to the memory chip DRAM3 accessible only at a lowest effective access speed. Upon receiving a mode signal representing a request for data holding (mode=mode 0), the address conversion control circuit 21 converts a logical address received from the CPU 3 together with the mode signal into a physical address corresponding to the memory regions R2 and R3 corresponding to the memory chips DRAM1 and DRAM2 used for data holding.

When high-speed access is requested, the memory chip DRAM0 mounted closest to the address conversion control circuit 21 and accessible at a highest effective access speed is used. Therefore, the effective access time is shorter compared to a structure in which the effective access time for the entire memory is set to the effective access time to the memory chip DRAM3 mounted furthest from the address conversion control circuit 21 and accessible only at a lowest effective access speed.

As shown in FIG. 5, the memory region of the memory chip DRAM0 mounted closest to the address conversion control circuit 21 can be divided into a high-speed access area and a low-speed access area. In this case, the memory chips are accessed at a greater number of levels of access speed.

EXAMPLE 5

With reference to FIGS. 8A and 8B, a memory system 500 including a compiler will be described. Identical elements previously discussed with respect to FIGS. 1A, 1B, 2A and 2B bear identical reference numerals and the descriptions thereof will be omitted. FIG. 8A shows a structure of the memory system 500. FIG. 8B shows a state of address conversion performed by the compiler 5 included in the memory system 500.

The memory system 500 includes an operating system 4, a CPU 3 and a memory 42. The operating system 4 includes a compiler 5. The type of mode signal (e.g., request for high-speed access or request for low-speed access) and a logical address-to be input to the compiler 5 are described in a program 7.

When high-speed access is requested, a mode signal indicating a request for high-speed access (mode=mode 1) and an arbitrary logical address (0000 to FFFF) are described in the program 7. When low-speed access is requested, a mode signal indicating a request for low-speed access (mode=mode 2) and an arbitrary logical address (0000 to FFFF) are described in the program 7. The mode signal and the logical address described in the program 7 are input to the compiler 5.

Upon receiving the mode signal (mode=mode 1) and the logical address from the program 7, the compiler 5 converts the logical address received from the program 7 into a physical address corresponding to the memory region R2 or R3 accessible at a high effective access speed and outputs the resultant physical address to the CPU 3. Upon receiving the mode signal (mode=mode 2) and the logical address from the program 7, the compiler 5 converts the logical address received from the program 7 into a physical address corresponding to the memory region R1 or R4 accessible only at a low effective access speed and outputs the resultant physical address to the CPU 3.

Since the CPU 3 receives the physical address converted by the compiler 5, the memory system 500 does not need an address conversion control circuit between the CPU 3 and the memory 42 for converting a logical address to a physical address. The control between the CPU 3 and the memory 42 is simplified, and thus the effective access speed to the memory 42 is further raised.

The user describes the type of the mode signal (e.g., request for high-speed access or request for low-speed access) and a logical address in the program 7. Describing the type of the mode signal in the program 7 is very easy and effective since the user prepares the program in consideration of which processing requires the memory 42 to be accessed most frequently and high-speed access to the memory 42.

For example, low-speed access is sufficient for inputting data from a keyboard and for periodically refreshing the memory 42 during the sleep mode. The user preparing a program also understands that battery backup of data for a resume function is required using memory cells having a long data holding time. For three-dimensional graphics processing, the user describes a mode signal representing a request for high-speed access.

In the case where the user obtains information on physical addresses corresponding to a request for high-speed access, a request for low-speed access and the like from database or the like, such a request is directly designated by calculating absolute values of the corresponding physical addresses. Even when it is difficult to calculate absolute values of the physical addresses of the memory cells, the absolute values are considered to be obtainable by grouping the address spaces so that each group is formed of adjacent address spaces, at least regarding the same type of processing such as, for example, high-speed access or low-speed access. Such an operation is performed by a relatively simple address conversion control circuit combined with the memory system 100 shown in FIGS. 1A and 1B or the memory system 200 shown in FIGS. 2A and 2B.

In the first through fifth examples, when the CPU 3 requests high-speed access, the address conversion control circuit 1 converts the logical address output by the CPU 3 into a physical address corresponding to the memory region R2 and R3 including memory cells accessible at a high speed.

Due to such an operation, it is not necessary to set the effective access speed to all the memory cells in the memory in accordance with the memory cells in the memory regions R1 and R4 accessible only at a lowest effective access speed. The memory cells accessible at a high effective access speed and the memory cells accessible only at a low effective access speed are used for different purposes in accordance the request from the CPU 3.

As a result, high-speed access is realized since memory cells are allowed to be accessed at a high speed without being influenced by the memory cells accessible only at a low effective access speed.

In the case where the memory includes a plurality of memory chips, the same effect is obtained. It is not necessary to set the effective access speed to all the memory chips in the memory in accordance with the memory chips accessible only at a lowest effective access speed. The memory chips accessible at a high effective access speed and the memory chips accessible only at a low effective access speed are used for different purposes in accordance the request from the CPU 3.

As a result, high-speed access is realized since memory chips are allowed to be accessed at a high speed without being influenced by the memory chips accessible only at a low effective access speed.

Since the memory chips accessible only at a lowest effective access speed can be used for low-speed access and do not need to be treated as defective. While the high-effective access speed is guaranteed, the production yield of the memory chips is improved.

The present invention is also applicable to a plurality of memory regions in one of the plurality of memory chips.

In the first through fifth examples, an access request to the address conversion control circuit 21 is executed by the CPU 3. The access request to the address conversion control circuit 21 can be executed by a memory controller for controlling a cache memory and a main memory, by a graphics control LSI, or by a DSP for executing signal processing.

In FIGS. 1A, 1B, 2A and 2B, the address conversion control circuit, the CPU 3 and the memory are formed of separate memory chips. The address conversion control circuit can be formed in the same memory chip with the CPU 3 or the memory.

The above-shown address conversion algorithms can be executed by special-purpose hardware using an ASIC or FPGA or by software using, for example, a multiple-purpose CPU, a flash memory or a ROM.

Among the inherent conditions regarding the access speed, the first through fifth examples relate to inherent conditions caused by the different distance of the memory cells (or chips) from the input/output circuit (or address conversion control circuit). Inherent conditions regarding the operating frequency of the bus will be described in the sixth example below.

EXAMPLE 6

A memory usable in a memory system according to the present invention can include a single memory chip or a plurality of memory chips. A memory including a plurality of memory chips will be described with reference to FIGS. 9A and 9B, and a memory including a single memory chip will be described with reference to FIGS. 10 and 11. The memory having a plurality of memory chips is represented by reference numeral 52. The memory having a single memory chip is represented by reference numeral 62.

First, with reference to FIGS. 9A and 9B, the memory 52 including a plurality of memory chips will be described. A memory system including the memory 52 is represented by reference numeral 600. FIG. 9A is a schematic view of a configuration of the memory system 600 in the sixth example according to the present invention. FIG. 9B shows a state of address conversion performed by the memory system 600 shown in FIG. 9A.

As shown in FIG. 9A, the memory 52 includes memory chips DRAM0, DRAM1, DRAM2 and DRAM3, and buses 52B and 52C for connecting the memory chips DRAM0 through DRAM3 with the address conversion control circuit 21. The memory chip DRAM0 is connected to the address conversion control circuit 21 through the buses 52B, and the memory chips DRAM1, DRAM2 and DRAM3 are connected to the address conversion control circuit 21 through the buses 52C. The buses 52B operates at a high frequency, and the buses 52C operates at a low frequency.

The memory chips DRAM0 through DRAM3 are used for different purposes in accordance with the buses to which they are connected (i.e., the buses 52B or 52C). The memory chip DRAM0 connected to the buses 52B operating at a high frequency is used for high-speed access. The memory chips DRAM1, DRAM2 and DRAM3 connected to the buses 52C operating at a low frequency are used for low-speed access or data holding mode.

Figure 10:
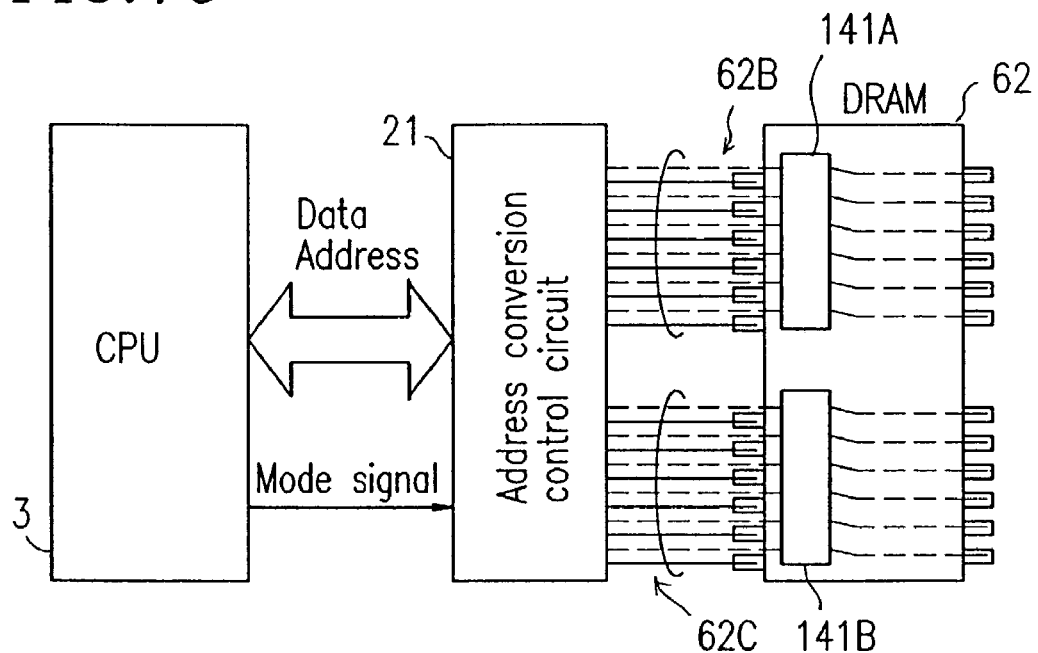
FIG. 10 is a schematic view of a configuration of another memory system in the sixth example according to the present invention.
Figure 11:
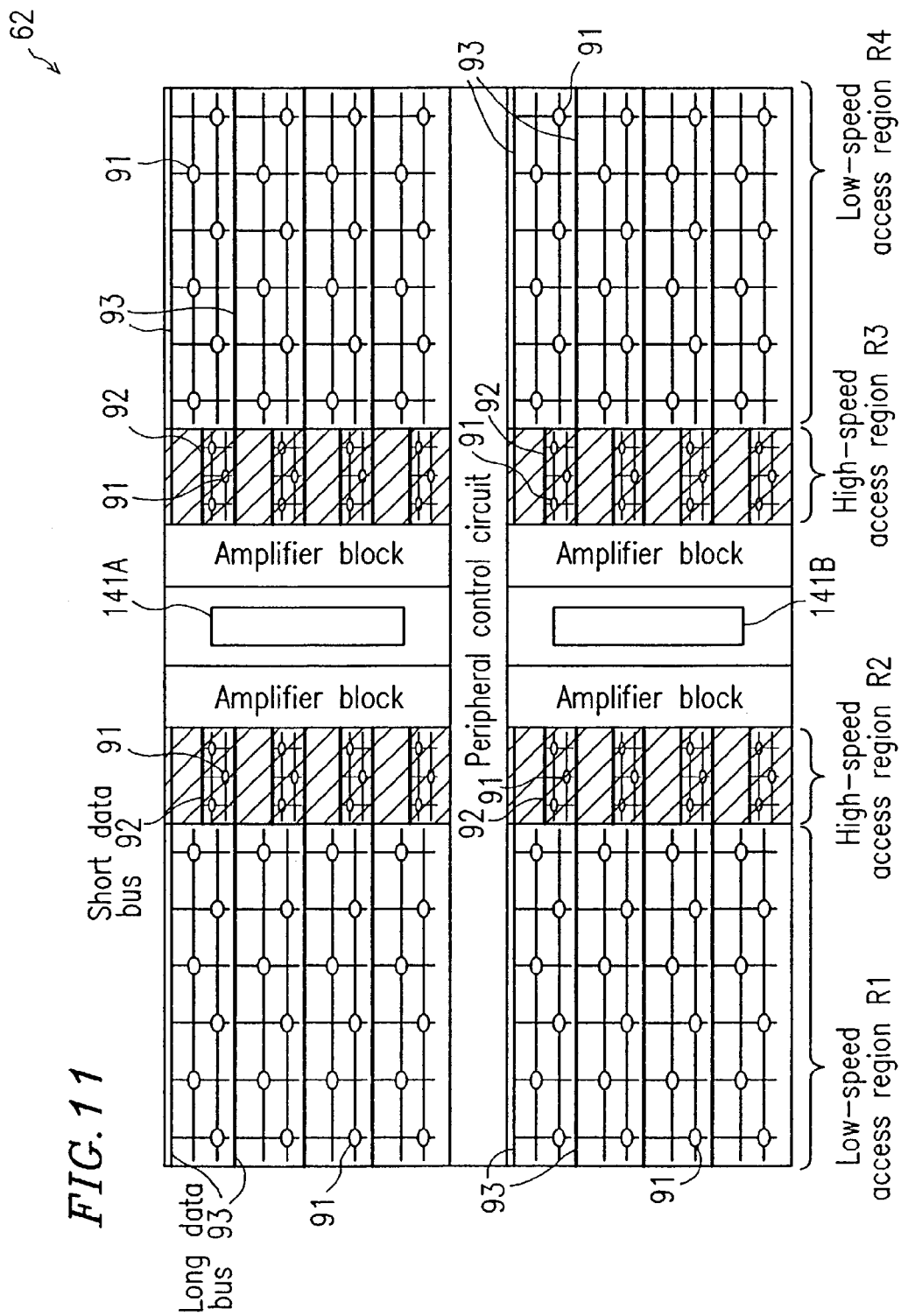
FIG. 11 shows a structure of a memory included in the memory system shown in FIG. 10.

Next, with reference to FIGS. 10 and 11, the memory 62 including a single memory chip will be described. A memory system including the memory 62 is represented by reference numeral 650. FIG. 10 is a schematic view of a configuration of the memory system 650. FIG. 11 shows a structure of the memory 62.

As shown in FIG. 10, the memory 62 includes a short data bus selection circuit 141A and a long data bus selection circuit 141B. The short data bus selection circuit 141A is connected to the address conversion control circuit 21 through buses 62B, and the long data bus selection circuit 141B is connected to the address conversion control circuit 21 through buses 62C. The buses 62B operate at a high frequency, and the buses 62C operate at a low frequency.

As shown in FIG. 11, the memory 62 includes short data buses 92 and long data buses 93.

The short data buses 92 are connected to the memory cells 91 in the memory regions R2 and R3 accessible at the high effective access speed, and the long data buses 93 are connected to the memory cells 91 in the memory regions R1 and R4 accessible at the low effective access speed. The memory cells 91 are divided into a high-effective access speed group connected to the short data buses 92 and a low-effective access speed group connected to the long data buses 93.

The short data bus selection circuit 141A connects the buses 62B to the memory cells 91 in the memory region R2 and R3 which are connected to the short data buses 92. The long data bus selection circuit 141B connects the buses 62C to the memory cells 91 in the memory region R1 and R4 which are connected to the long data buses 93.

The memory cells are used for different purposes in accordance with the buses to which they are connected (i.e., the buses 62B or 62C in FIG. 10). The memory cells 91 in the memory regions R2 and R3 connected to the buses 62B are used for high-speed access. The memory cells 91 in the memory regions R1 and R4 connected to the buses 62C are used for low-speed access.

Figure 12:
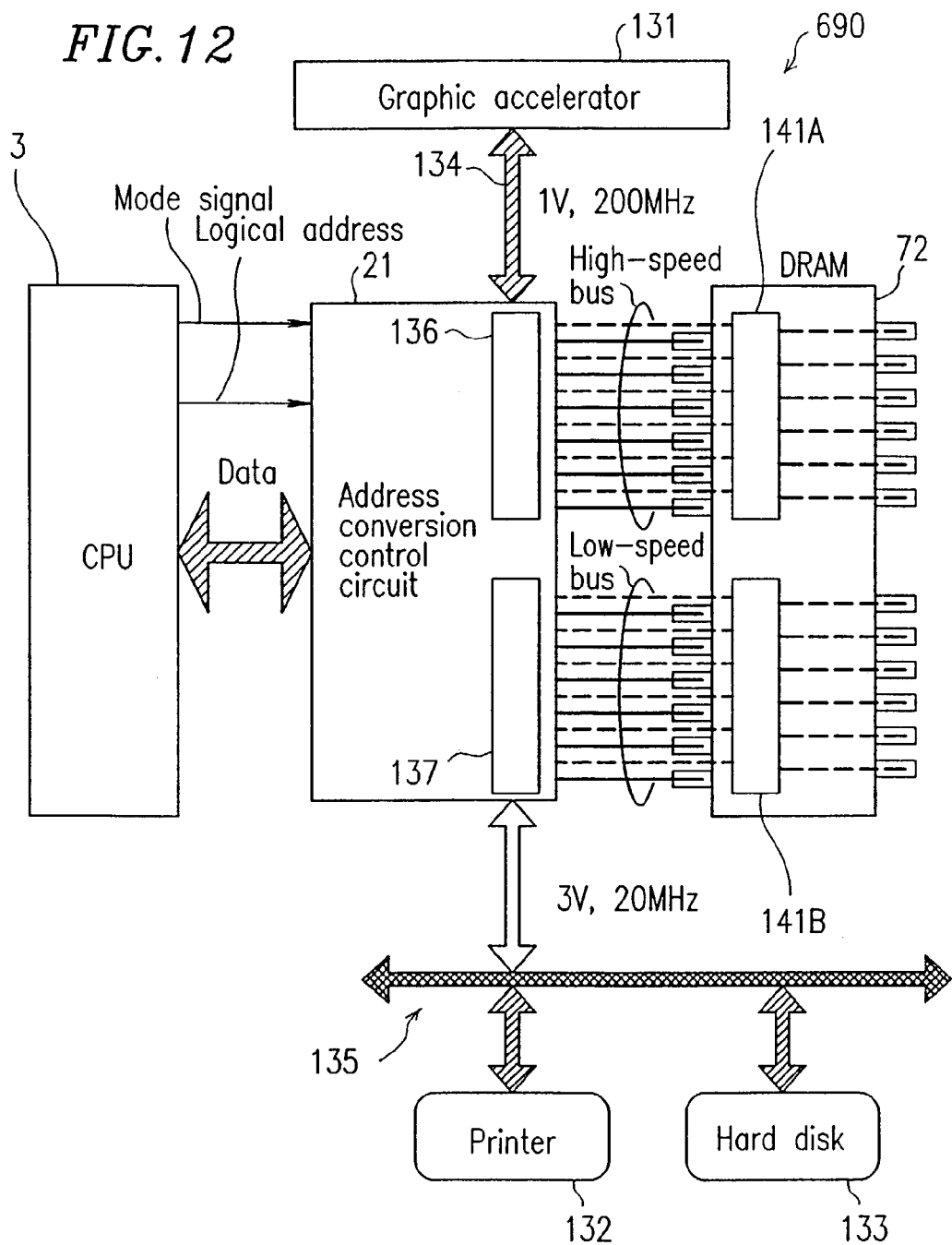
FIG. 12 is a schematic view of a configuration of a memory system in the sixth example according to the present invention.

With reference to FIG. 12, an exemplary operation of the memory system including the memory 52 or 62 will be described. For convenience, the memory system is represented by reference numeral 690, and the memory is represented by reference numeral 72 in FIG. 12. Although the memory 72 in the memory system 690 includes only one memory chip in FIG. 14, the memory 72 can be either the memory 52 (FIGS. 9A and 9B) or the memory 62 (FIGS. 10 and 11).

As shown in FIG. 12, the memory system 690 is connected to a plurality of devices through buses operating at different voltages. The address conversion control circuit 21 is connected to a printer 132 and a hard disk 133 through a bus 135 operating at a voltage of 3 V and a frequency of 20 MHz. The memory 72 is used as a buffer memory of the printer 132 and the hard disk 133. Since printers and hard disks generally include LSIs fabricated using relatively old device technologies, the bus connecting these devices and the memory system needs to be operable at a voltage of 3 V or more.

The address conversion control circuit 21 is connected to a graphic accelerator 131 through a bus 134 operating at a voltage of 1 V and a frequency of 200 MHz. Since high-speed graphic accelerators and cache memories are generally fabricated using most advanced technologies, the bus connecting these devices and the memory system needs to be operable at a voltage of as low as about 1 V in order to provide reliable performance.

The address conversion control circuit 21 is connected to the bus 134 through an input/output circuit 136 and is connected to the bus 135 through an input/output circuit 137. Since the buses 134 and 135 operate at different voltages, the input/output circuits 136 and 137 need to have different interface voltages.

The interface voltage of the input/output circuit 136 is set to be suitable to the operating voltage of 1 V of the bus 134. The interface voltage of the input/output circuit 137 is set to be suitable to the operating voltage of 3 V of the bus 135.

The memory system 690 operates, for example, as follows.

Upon receiving a mode signal indicating a request for the bus 134 operating at a voltage of 1 V from the CPU 3, the address conversion control circuit 21 converts a logical address received from the CPU 3 together with the mode signal into a physical address corresponding to the memory region including the memory cell which is connected to the bus 134. Upon receiving a mode signal indicating a request for the bus 135 operating at a voltage of 3 V from the CPU 3, the address conversion control circuit 21 converts a logical address received from the CPU 3 together with the mode signal into a physical address corresponding to the memory region including the memory cell which is connected to the bus 135.

Accordingly, the memory 72, although including only one memory chip, is allowed to be connected separately or simultaneously to the buses 134 and 135 having different operating voltages.

EXAMPLE 7

As described above, the seventh and eighth examples relate to inherent conditions regarding the power consumption of a memory. Among the inherent conditions regarding the power consumption, inherent conditions regarding the level of the threshold voltage of transistors will be described in the seventh example.

Figure 13:
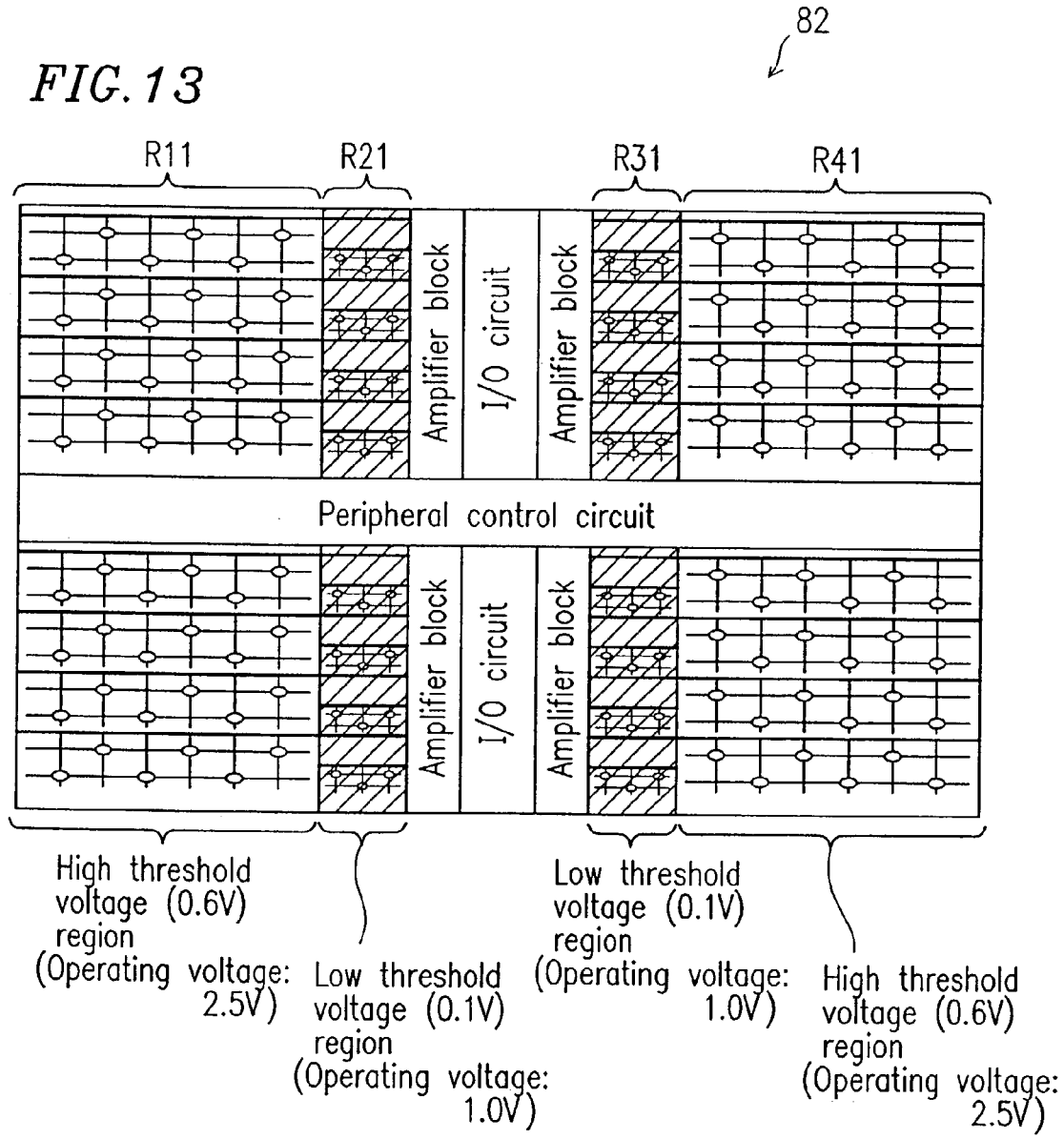
FIG. 13 shows a structure of a memory in a seventh example according to the present invention.

FIG. 13 shows a structure of a memory 82 usable in a memory system according to the present invention.

As shown in FIG. 13, the memory 82 includes memory regions R21 and R31 including transistors having a low threshold voltage (about 0.1 V) and memory regions R11 and R41 including transistors having a high threshold voltage (about 0.6 V).

The memory system including the memory 82 operates, for example, as follows. Although not shown, the memory system in the seventh example generally has the same structure as those described in the previous examples except for the memory 82.

Upon receiving a mode signal representing a high threshold voltage operation from the CPU, the address conversion control circuit converts a logical address received from the CPU together with the mode signal into a physical address corresponding to the memory region R11 or R41 having a high transistor threshold voltage (about 0.6 V). Upon receiving a mode signal representing a low threshold voltage operation from the CPU, the address conversion control circuit converts a logical address received from the CPU together with the mode signal into a physical address corresponding to the memory region R21 or R31 having a low transistor threshold voltage (about 0.1 V).

For example, when an application program for which energy saving has priority is to be executed, a memory region having a low transistor threshold voltage (about 0.1 V) is allowed to be designated to be accessed.

It is not necessary to set the transistor threshold voltage of the entire memory 82 in accordance with the high transistor threshold voltage of the memory regions R11 and R41. The transistors having a high threshold voltage and the transistors having a low threshold voltage are allowed to be used for different purposes in accordance with the level of the access request from the CPU.

As a result, the power consumption is reduced since the transistors having a low threshold voltage are effectively used without being influenced by the transistors having a high threshold voltage.

EXAMPLE 8

Among the inherent conditions regarding the power consumption, inherent conditions regarding the data holding time at standby will be described in the eighth example.

Figure 14A:
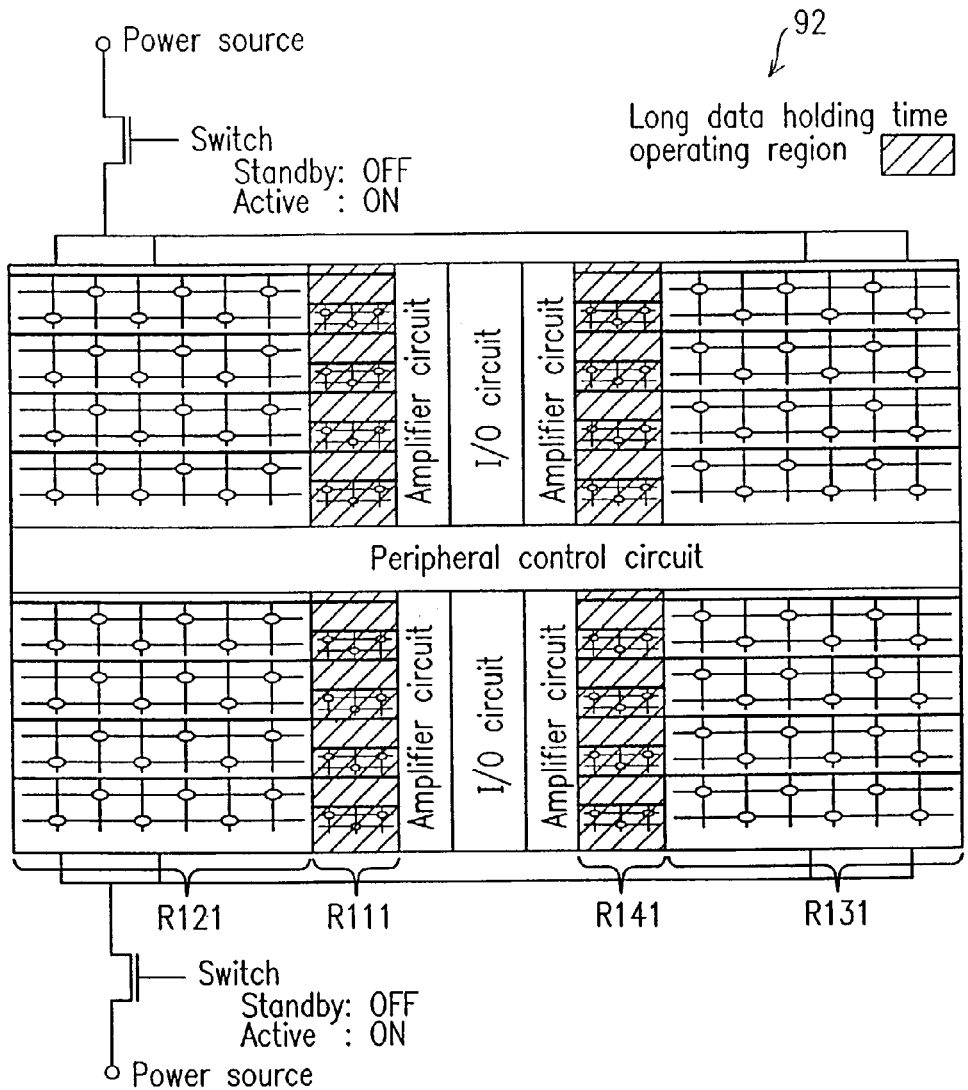
FIG. 14A shows a structure of a memory in an eighth example according to the present invention.
Figure 14B:
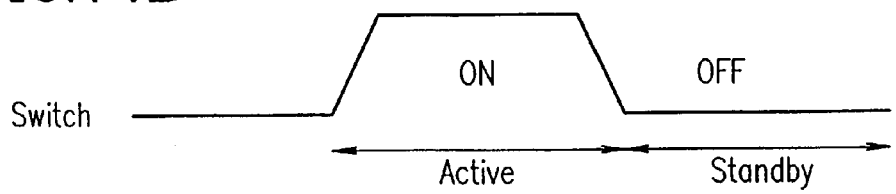
FIG. 14B shows an ON state and an OFF state of transistors included in the memory shown in FIG. 14A.

FIG. 14A shows a structure of a memory 92 usable in a memory system according to the present invention. FIG. 14B shows the relationship between ON and OFF states of the switches of the memory 92 and the active and standby states of the memory cells connected to the switches.

As shown in FIG. 14A, the memory 92 includes memory regions R111 and R141 to which the power is kept supplied at standby and memory regions R121 and R131 to which the power is not supplied at standby.

DRAMs and SRAMs generally lose data when the power is turned OFF. In order to maintain the data, it is necessary to keep the power to be supplied even at standby. DRAMs further require refreshing, which inevitably results in increased power consumption at standby. A battery-operated memory system needs to have the power consumption at standby reduced. In the case where it is necessary to maintain the data only in half or one third of the memory cells but not in all the memory cells, the power consumption at standby is reduced by turning OFF the switches connected to the memory regions having the memory cells which do not need to maintain the data.

The memory system including the memory 92 operates, for example, as follows. Although not shown, the memory system in the eighth example generally has the same structure as those described in the previous examples except for the memory 92, although not shown.

Upon receiving a mode signal representing a long data holding time operation from the CPU, the address conversion control circuit converts a logical address received from the CPU together with the mode signal into a physical address corresponding to the memory region R121 or R131 to which power is kept supplied at standby. Upon receiving a mode signal representing a short data holding time operation from the CPU, the address conversion control circuit converts a logical address received from the CPU together with the mode signal into a physical address corresponding to the memory region R111 or R141 to which the power is not supplied at standby.

It is not necessary to set the requirements of the entire memory 92 in accordance with the memory cells to which the power is kept supplied. The memory cells to which the power is not supplied at standby and the memory cells to which the power is kept supplied at standby are allowed to be used for different purposes in accordance with the level of the access request from the CPU.

As a result, the power consumption is reduced since the memory cells to which the power is not supplied at standby are utilized without being influenced by the memory cells to which the power is kept supplied at standby.

The principle used in the eighth example can be applied to the memory 82 in the seventh example (FIG. 13). In the high threshold voltage regions R11 and R41, the power supply is stopped at standby to avoid the problem of leak current. In the low threshold voltage regions R21 and R31, the power is kept supplied at standby. In this manner, the two types of regions are used for different purposes in accordance with the request from the CPU.

In the seventh and eighth examples, the memory includes a single memory chip. The same effect is achieved in a structure in which the memory includes a plurality of memory chips, as long as the plurality of memory chips operate based on the same principle. The plurality of memory chips can be, for example, DRAMs, SRAMs, flash memories, ROMs, or ferroelectric memories.

As described above, a memory system according to the present invention allows memories therein to have different types of performance. Address spaces of memory cells having satisfactory characteristics and address spaces of memory cells having poor characteristics are separately designated for different purposes. Accordingly, the memory cells or chips having satisfactory characteristics are allowed to perform to their full capability without being influenced by memory cells or chips having inferior characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A memory system, comprising:
a memory including a plurality of memory regions having memory cells exhibiting substantially the same physical and operational characteristics; and
an address conversion device for converting a logical address into a physical address based on a correspondence between an address space and the plurality of memory regions,
wherein the correspondence is defined based on an inherent physical performance condition of the memory.

2. A memory system according to claim 1, wherein the correspondence defines that continuous regions included in the address space are allocated to one of the plurality of memory regions in the memory.

3. A memory system according to claim 1, wherein the memory includes a plurality of memory chips, and the plurality of memory regions are formed of the plurality of memory chips.

4. A memory system according to claim 1, wherein the memory includes a single memory chip, and the plurality of memory regions are formed of the single memory chip.

5. A memory system according to claim 1, wherein the address space and the plurality of memory regions have a plurality of correspondences therebetween, and the address conversion device includes:
a selection device for selecting one of the plurality of correspondences between the address space and the plurality of memory regions based on selection information; and
a conversion device for converting the logical address into the physical address based on the selected correspondence.

6. A memory system according to claim 5, wherein the selection device includes:
an association memory for accumulating the plurality of correspondences; and
an output device for outputting one of the plurality of correspondences accumulated in the association memory based on the selection information.

7. A memory system according to claim 1, wherein the address conversion device includes a compiler for converting a logical address input from an application program into a physical address based on the correspondence.

8. A memory system according to claim 1, wherein the inherent physical performance condition includes a first inherent condition regarding access speed to the memory and a second inherent condition regarding power consumption of the memory.

9. A memory system according to claim 8, wherein the first inherent condition includes an inherent condition regarding a difference between a distance of a memory cell included in the memory from an input/output circuit and a distance of another memory cell included in the memory from the input/output circuit, an inherent condition regarding the level of an operating frequency of a bus, and an inherent condition regarding the level of an operating voltage of the bus; and the second inherent condition includes an inherent condition regarding the level of a threshold voltage of a transistor included in the memory and an inherent condition regarding a data holding time at standby.

10. A memory system according to claim 8, wherein the first inherent condition includes an inherent condition regarding a difference between a distance of a memory cell included in the memory from the address conversion device and a distance of another memory cell included in the memory from the address conversion device, an inherent condition regarding the level of an operating frequency of a bus, and an inherent condition regarding the level of an operating voltage of the bus; and the second inherent condition includes an inherent condition regarding the level of a threshold voltage of a transistor included in the memory and an inherent condition regarding a data holding time at standby.

11. A memory system according to claim 1, wherein the inherent physical performance condition includes a first inherent condition regarding access speed to the memory.

12. A memory system according to claim 1, wherein the inherent physical performance condition of the memory is an inherent condition regarding a data holding time at standby,
the plurality of memory regions include a first memory region to which power is supplied at standby and a second memory to which power is not supplied at standby, and
the logical address is converted to a physical address corresponding to the first memory region or the second memory region based on the data holding time.

13. A memory system according to claim 1, wherein the inherent physical performance condition of the memory is an inherent condition regarding a data holding time at standby,
the plurality of memory regions include a first memory region refreshed at standby and a second memory not refreshed at standby, and the logical address is converted to a physical address corresponding to the third memory region or the fourth memory region based on the data holding time.

14. A memory system according to claim 1, wherein the inherent physical performance condition includes a first inherent condition regarding power consumption of the memory.

15. A memory system according to claim 14, wherein the first inherent condition includes at least one of an inherent condition regarding the level of a threshold voltage of a transistor included in the memory and an inherent condition regarding a data holding time in a standby state.

16. A memory system according to claim 14, wherein the address conversion device converts the logical address into a physical address corresponding to a first memory region to which power is supplied in a standby state of the memory system or a second memory region to which power is not supplied in the standby state based on the first inherent condition.

17. A memory system according to claim 16, wherein the first inherent condition includes at least one of an inherent condition regarding the level of a threshold voltage of a transistor included in the memory and an inherent condition regarding a data holding time in the standby state.

18. A memory system according to claim 14, wherein the address conversion device converts the logical address into a physical address corresponding to a first memory region which is refreshed in a standby state of the memory system or a second memory region which is not refreshed in the standby state based on the first inherent condition.

19. A memory system according to claim 18, wherein the first inherent condition includes at least one of an inherent condition regarding the level of a threshold voltage of a transistor included in the memory and an inherent condition regarding a data holding time in the standby state.

\* \* \* \* \*